United States Patent
Tremel et al.

(10) Patent No.: US 10,105,642 B2
(45) Date of Patent: Oct. 23, 2018

(54) DEVICE FOR THE SEPARATION OF WATER FROM A FLUID FLOW CONTAINING WATER

(71) Applicant: Siemens Aktiengesellschaft, Munich (DE)

(72) Inventors: Alexander Tremel, Moehrendorf (DE); Uwe Lenk, Zwickau (DE); Markus Ziegmann, Baiersdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 69 days.

(21) Appl. No.: 15/038,022

(22) PCT Filed: Nov. 10, 2014

(86) PCT No.: PCT/EP2014/074113
§ 371 (c)(1),
(2) Date: May 19, 2016

(87) PCT Pub. No.: WO2015/074901
PCT Pub. Date: May 28, 2015

(65) Prior Publication Data
US 2016/0296884 A1 Oct. 13, 2016

(30) Foreign Application Priority Data

Nov. 19, 2013 (DE) .................. 10 2013 223 562

(51) Int. Cl.
*B01D 53/22* (2006.01)
*B01D 53/26* (2006.01)
(Continued)

(52) U.S. Cl.
CPC ......... *B01D 53/229* (2013.01); *B01D 5/0075* (2013.01); *B01D 53/22* (2013.01);
(Continued)

(58) Field of Classification Search
CPC ...... B01D 53/28; B01D 63/02; B01D 53/265; B01D 63/06; B01D 53/22; B01D 53/229;
(Continued)

(56) References Cited

U.S. PATENT DOCUMENTS

| | | | | |
|---|---|---|---|---|
| 4,220,535 A | * | 9/1980 | Leonard ................. | B01D 53/22 210/321.89 |
| 5,034,025 A | * | 7/1991 | Overmann, III ....... | B01D 53/22 95/52 |

(Continued)

FOREIGN PATENT DOCUMENTS

| | | | |
|---|---|---|---|
| DE | 10214078 A1 | 10/2002 | ............. B01D 53/22 |
| DE | 102004048438 A1 | 4/2006 | ............. B01D 53/26 |

(Continued)

OTHER PUBLICATIONS

Hwang "Fundamentals of membrane transport" Korean J. Chem. Eng., 28(1), 1-15 (2011).*

(Continued)

*Primary Examiner* — Anthony R Shumate
(74) *Attorney, Agent, or Firm* — Slayden Grubert Beard PLLC (57) ABSTRACT

A device for the separation of water, in particular water vapor, from a fluid flow containing water, in particular water vapor, may include at least a water-permeable membrane body that delimits at least one membrane body interior space, wherein at least one hydrophobic fluid is located in the membrane body interior space for receiving water, in particular water vapor, which exits the fluid flow and passes through the membrane body into the membrane body interior space.

12 Claims, 2 Drawing Sheets

(51) Int. Cl.
*B01D 53/28* (2006.01)
*B01D 63/06* (2006.01)
*B01D 61/24* (2006.01)
*B01D 5/00* (2006.01)

(52) U.S. Cl.
CPC ......... *B01D 53/265* (2013.01); *B01D 53/268* (2013.01); *B01D 53/28* (2013.01); *B01D 61/246* (2013.01); *B01D 63/06* (2013.01); *B01D 2311/06* (2013.01); *B01D 2311/106* (2013.01)

(58) Field of Classification Search
CPC ......... B01D 2311/106; B01D 2311/06; B01D 5/0075; B01D 61/246; B01D 53/268
See application file for complete search history.

(56) References Cited

U.S. PATENT DOCUMENTS

| | | | |
|---|---|---|---|
| 5,236,474 A * | 8/1993 | Schofield | B01D 53/22 95/47 |
| 6,616,735 B1 | 9/2003 | Burban et al. | 96/8 |
| 6,669,177 B2 | 12/2003 | Shimanuki et al. | 261/96 |
| 8,167,982 B2 | 5/2012 | Deubler et al. | 96/8 |
| 8,709,132 B1 * | 4/2014 | Elkind | B01D 53/22 205/340 |
| 9,283,518 B2 * | 3/2016 | Ehrenberg | B01D 53/268 |
| 9,676,492 B2 * | 6/2017 | Tichborne | B64D 37/32 |
| 2009/0071334 A1 | 3/2009 | Ryu | 95/117 |
| 2010/0151337 A1 | 6/2010 | Kanazawa | 429/413 |
| 2010/0213125 A1 * | 8/2010 | Fontalvo Alzate | B01D 61/362 210/638 |
| 2013/0312445 A1 * | 11/2013 | Isetti | B01D 53/1425 62/271 |
| 2014/0319056 A1 * | 10/2014 | Fuchigami | C02F 1/445 210/648 |
| 2015/0053249 A1 * | 2/2015 | John | E03B 3/28 136/244 |
| 2015/0343417 A1 * | 12/2015 | Puranik | B01J 20/186 210/660 |
| 2016/0122115 A1 * | 5/2016 | Peppou | B01D 53/28 62/4 |

FOREIGN PATENT DOCUMENTS

| | | | |
|---|---|---|---|
| EP | 0532368 A2 | 3/1993 | ............ B01D 53/22 |
| EP | 2239049 A1 | 10/2010 | ............ B01D 53/22 |
| WO | 2015/074901 A1 | 5/2015 | ............ B01D 53/22 |

OTHER PUBLICATIONS

German Office Action, Application No. 102013223562.3, 8 pages, dated Oct. 29, 2014.
International Search Report and Written Opinion, Application No. PCT/EP2014/074113, 20 pages, dated Feb. 9, 2015.

* cited by examiner

FIG 1

DEVICE FOR THE SEPARATION OF WATER FROM A FLUID FLOW CONTAINING WATER

CROSS-REFERENCE TO RELATED APPLICATIONS

This application is a U.S. National Stage Application of International Application No. PCT/EP2014/074113 filed Nov. 10, 2014, which designates the United States of America, and claims priority to DE Application No. 10 2013 223 562.3 filed Nov. 19, 2013, the contents of which are hereby incorporated by reference in their entirety

TECHNICAL FIELD

The invention relates to a device for the separation of water, in particular water vapor, from a fluid flow, in particular a gas flow, containing water, in particular water vapor, including at least one water-permeable membrane body that delimits at least one membrane body interior space.

BACKGROUND

The separation of water from fluid flows containing water, and thus the recovery of water to save resources, is becoming ever more important. In this context, it is known for example to separate water vapor from waste gas flows. The separated water vapor is conventionally converted to water using cooling-intensive condensation processes. This principle can be implemented by way of surface condensers that are placed in waste gas flows, for example taking the form of tube bundle or plate heat exchangers. For the separation of water vapor from gas flows containing water vapor, membrane bodies that are permeable to water vapor, that is to say are selective to water vapor, have further been proposed, wherein the water vapor permeates out of the gas flow and through the membrane body into a membrane body interior space that is delimited by the membrane body. The propulsive force for the permeation of the water vapor through the membrane body is a reduced concentration of water vapor in the membrane body interior space and/or a vacuum applied in the membrane body interior space and the resulting drop in pressure, in particular a drop in the water vapor partial pressure. The water vapor that has permeated into the membrane body interior space is converted to liquid water by way of cooling-intensive condensation processes.

Consequently, the technical approaches that are known from the prior art to the separation of water from a fluid flow containing water are susceptible to improvement, in particular as regards the need for cooling that is required therefor in the context of condensing the water vapor.

SUMMARY

One embodiment provides a device for the separation of water, in particular water vapor, from a fluid flow containing water, in particular water vapor, including at least one water-permeable membrane body that delimits at least one membrane body interior space, wherein there is at least one hydrophobic fluid in the membrane body interior space, for taking up water, in particular water vapor, that passes out of the fluid flow, through the membrane body and into the membrane body interior space.

In one embodiment, the device includes at least one supply system configured to supply the hydrophobic fluid into the membrane body interior space and at least one removal system configured to remove the hydrophobic fluid from the membrane body interior space.

In one embodiment, the membrane body is of hollow cylindrical construction, wherein a supply system configured to supply the hydrophobic fluid into the membrane body interior space is or may be arranged on or in the region of a first end face of the membrane body, and a removal system configured to remove the hydrophobic fluid from the membrane body interior space is or may be arranged on or in the region of a second end face of the membrane body.

In one embodiment, the membrane body is of hollow cylindrical construction, wherein a supply system having at least one supply channel that passes through certain regions of the membrane body interior space, coaxially with respect to the longitudinal axis of the membrane body, is provided, wherein a removal system is or may be arranged in the region of an annular space that radially surrounds the at least one supply channel.

In one embodiment, the device includes at least one condensation system that is associated with the membrane body, in particular being downstream thereof, for condensing gaseous water that is contained in the hydrophobic fluid and/or at least one cooling system that is associated with the membrane body, in particular being downstream thereof, for cooling hydrophobic fluid that has been heated by condensation of water vapor.

In one embodiment, the device includes at least one separating system, which is associated with the membrane body, where appropriate associated with the condensation system that is associated with the membrane body, and is in particular downstream thereof, for the chemical and/or physical, in particular mechanical, separation of the water that is taken up in the hydrophobic fluid from the hydrophobic fluid.

In one embodiment, the hydrophobic fluid is a natural or synthetic organic gas and/or a natural or synthetic organic liquid, in particular a natural or mineral or synthetic oil.

Another embodiment provides a method for the separation of water, in particular water vapor, from a fluid flow containing water, in particular water vapor, wherein the water, in particular water vapor, to be separated is transferred through at least one water-permeable membrane body into at least one hydrophobic fluid that is within a membrane body interior space delimited by the membrane body.

In one embodiment, the hydrophobic fluid flows through the membrane body interior space, in particular in the manner of a circuit.

In one embodiment, a negative pressure is applied within the membrane body interior space.

In one embodiment, gaseous water contained in the hydrophobic fluid is condensed.

In one embodiment, the pressure of the gaseous water that is contained in the hydrophobic fluid is elevated before the condensation.

In one embodiment, the water contained in the hydrophobic fluid is separated from the hydrophobic fluid chemically and/or physically, in particular mechanically.

In one embodiment, the hydrophobic fluid comprises a natural or synthetic organic gas and/or a natural or synthetic organic liquid, in particular a natural or mineral or synthetic oil.

BRIEF DESCRIPTION OF THE DRAWINGS

Example aspects of the invention are described below with reference to the drawings, in which.

DETAILED DESCRIPTION

Embodiments of the invention provide an improved device for the separation of water from a fluid flow containing water.

Some embodiment provides a device for the separation of water from a fluid flow containing water, which device includes at least one hydrophobic fluid in the membrane body interior space, for taking up water, in particular water vapor, that passes out of the fluid flow, through the membrane body and into the membrane body interior space.

The technical teaching relates to a particular principle for the separation of water, in particular water vapor, in general water molecules, from a fluid flow containing water, in particular water vapor, in particular a gas flow containing water vapor. In particular, the technical teaching according to the invention makes it possible in this way to separate water vapor from gas flows containing water vapor, in particular from waste gas flows containing water vapor. The principle according to the invention may be implemented by means of the device according to the invention, which is described in more detail below.

In some embodiment, the device may include at least one membrane body that delimits at least one membrane body interior space. The membrane body is formed from at least one material that is permeable to liquid and gaseous water molecules and is thus selective to water, in particular selective to water vapor, such as sulfonated poly(ether ether ketone), abbreviated to SPEEK, sulfonated poly(ether sulfone), abbreviated to SPES, or polyether block amide, abbreviated to PEBAX. The fact that the material forming the membrane body is constructed to be selective to water, in particular selective to water vapor, enables water of high purity to be recovered, since undesired constituents of the fluid flow containing water cannot pass through the membrane body and into the membrane body interior space.

The material forming the membrane body may be porous, that is to say it may have a structure that is open-pored, in particular at least in certain regions. The pore size of the material forming the membrane body is typically in a range between 1 and 50 nm, in particular in a range between 1 and 10 nm. It goes without saying that the pore size of the material forming the membrane body may in exceptional cases also be outside the pore size ranges mentioned. In principle, however, it is also conceivable for the material forming the membrane body not to be porous.

Within the membrane body, that is to say in the membrane body interior space that is delimited by the membrane body, there is at least one hydrophobic fluid, that is to say in particular at least one hydrophobic liquid. The hydrophobic fluid is or includes in general at least one substance that, because of its structural, in particular chemical, dissimilarity from water, is immiscible with water or is only very poorly miscible with water. Thus, the hydrophobic fluid may be for example a natural or synthetic organic liquid, in particular a natural or mineral or synthetic oil.

The use of natural vegetable oils, that is to say the use of plant oils, as the hydrophobic fluid is useful for example if the water recovered from the hydrophobic fluid is used in the food technology sector. A further preparation stage of the water recovered in this manner is not absolutely necessary, since the small quantities of residue of hydrophobic fluid that may be contained in the recovered water do not themselves have an adverse effect on the suitability of the recovered water as a foodstuff or comestible.

The device may be designed such that the hydrophobic fluid flows continuously through the membrane body interior space, that is to say in particular such that the hydrophobic fluid circulates through the membrane body interior space in the manner of a circuit. As a result of the possibility of circulation of the hydrophobic fluid through the membrane body interior space in the manner of a circuit, the operating costs of the device according to the invention, in particular as regards the hydrophobic fluid, are comparatively low, and similarly the device according to the invention is in this way designed for long-term operation.

The principle for the separation of water, in particular water vapor, from a fluid flow containing water, in particular water vapor, is based on the fact that the water that has passed, that is to say permeated, through the membrane body, in particular the water vapor that has passed, that is to say permeated, through the membrane body accumulates or is dispersed within the hydrophobic fluid in the membrane body interior space. The hydrophobic fluid in the membrane body interior space thus serves to take up the water or water vapor that has passed through the membrane body and into the membrane body interior space, generally the water molecules that have passed through the membrane body and into the membrane body interior space.

The propulsive force for the permeation of water or water vapor through the membrane body is the taking up of water molecules in the hydrophobic fluid and the resulting or maintained drop in concentration (drop in water concentration) between the fluid flow containing water or water vapor out of which the water or water vapor is to be separated and the hydrophobic fluid. There is thus a drop between the water concentration at the contact surface outside the membrane body, that is to say the water concentration of the fluid flow that flows outside the membrane body, and the water concentration at the contact surface within the membrane body, that is to say the water concentration within the hydrophobic fluid in the membrane body interior space. The water concentration (solubility) in the fluid flow containing water or water vapor is in this case typically markedly higher than the water (vapor) concentration in the hydrophobic fluid, which ideally approaches zero. This also makes it possible for there to be a separation of water or water vapor from fluid flows containing water or water vapor and having comparatively low water (vapor) concentrations.

As will become clear below, the accumulation or dispersion of the water or water vapor in the hydrophobic fluid and hence the taking up of the water or water vapor in the hydrophobic fluid may further, that is to say as an alternative or in particular in addition, be promoted by a drop in pressure, that is to say a difference in pressure, between the fluid flow containing water or water vapor and the hydrophobic fluid. The pressure difference may in particular be brought about by a negative pressure within the membrane body interior space. To bring about the negative pressure within the membrane body interior space, the device may include a pressure regulating device such as a vacuum pump.

The water taken up or contained in the hydrophobic fluid and separated from the fluid flow containing water or water vapor may be separated and thus recovered from the hydrophobic fluid by means of chemical and/or physical, in particular mechanical, separation principles. For this purpose, the device according to the invention advantageously includes at least one separating system, which is associated with the membrane body and is in particular downstream thereof, for the chemical and/or physical, in particular mechanical, separation of the water contained in the hydrophobic fluid from the hydrophobic fluid.

In order to bring about the above-mentioned drop between the water concentration outside the membrane body, that is to say the water concentration of the fluid flow flowing outside the membrane body, and the water concentration within the membrane body, that is to say the water concentration within the hydrophobic fluid in the membrane body interior space, it is advantageous if the hydrophobic fluid flows through the membrane body interior space, that is to say in particular circulates in or through the membrane body interior space in an in particular closed circuit. For this purpose, the device according to the invention may include at least one supply system supply system configured to supply the hydrophobic fluid into the membrane body interior space and at least one removal system removal system configured to remove the hydrophobic fluid from the membrane body interior space. The supply system, like the removal system, may include suitable conveying facilities, such as pumps, for supplying or removing the hydrophobic fluid into and out of the membrane body interior space.

Thus, by way of the supply system a supply—in particular a continuous supply—of hydrophobic fluid into the membrane body interior space is possible. By way of the removal system, accordingly, a removal—in particular a continuous removal—of hydrophobic fluid out of the membrane body interior space is possible. Between the removal system and the supply system it is therefore possible to create an in particular closed circuit, wherein hydrophobic fluid that is guided by way of the removal system out of the membrane body interior space can be guided into the supply system and by way of the latter back into the membrane body interior space. The membrane body, that is to say in particular the membrane body interior space, is thus connected within the circuit formed between the removal system and the supply system. It is possible for further functional components of the device according to the invention, such as an above-mentioned separating system, to be connected within the circuit formed between the removal system and the supply system.

In principle, it may be ensured by way of the hydrophobic fluid circulating in the manner of a circuit through the membrane body interior space that hydrophobic fluid that is enriched with water or water vapor that has passed out of the fluid flow containing water or water vapor and through the membrane body in the membrane body interior space can be removed from the membrane body. In this way, there is in the membrane body interior space always a comparatively small water (vapor) concentration, that is to say at least below the water (vapor) concentration in the fluid flow containing water, and this can have a positive effect on the creation and maintenance of the above-mentioned propulsive force that brings about the passage of the water or water vapor out of the fluid containing water or water vapor, through the membrane body and into the membrane body interior space.

For creation of the propulsive force that brings about the permeation of water, in particular water vapor, out of the fluid flow containing water, in particular water vapor and through the membrane body into the membrane body interior space, it is essential that there is a very low water (vapor) concentration at the surface of the membrane body that faces the fluid flow containing water or water vapor.

The creation of a corresponding circuit in or through which the hydrophobic fluid circulates may be brought about by a construction for example such that the membrane body is of hollow cylindrical construction, wherein a supply system supply system configured to supply the hydrophobic fluid into the membrane body interior space is or may be arranged on or in the region of a first end face of the membrane body, and a removal system removal system configured to remove the hydrophobic fluid from the membrane body interior space is or may be arranged on or in the region of a second end face of the membrane body. This embodiment of the device according to the invention thus enables axial through-flow and hence axial circulation of the hydrophobic fluid through the membrane body and the membrane body interior space respectively, during which the supply and removal of the hydrophobic fluid into and out of the membrane body interior space take place by way of corresponding supply and removal facilities arranged on or in the region of the respective end faces of the membrane body. The supply and removal of the hydrophobic fluid in this case typically take place by way of different, that is to say in particular opposing, end faces of the membrane body. It goes without saying that the same principle can be transferred to membrane bodies having other geometries, that is to say for example membrane bodies constructed in the shape of a plate or sphere.

The creation of a corresponding circuit in or through which the hydrophobic fluid circulates may also be brought about by a construction for example such that the membrane body is of hollow cylindrical construction, wherein a supply system having at least one supply channel that passes through certain regions of the membrane body interior space, coaxially with respect to the longitudinal axis of the membrane body, is provided, wherein a removal system is provided in the region of an annular space that radially surrounds the supply channel. In this embodiment of the device according to the invention, the hydrophobic fluid flows by way of a supply system that is typically arranged on or in the region of a first end face of the membrane body, first into at least one supply channel that passes axially through the membrane body interior space and is hence arranged within the membrane body interior space. The hydrophobic fluid that passes out of the at least one supply channel, typically in the region of a second end face of the membrane body that lies opposite the first end face, and into the membrane body interior space flows through an annular space, which radially surrounds the at least one supply channel, to a removal system which, in this case, and similarly to the supply system, is typically arranged on or in the region of the first end face of the membrane body. In this embodiment of the device according to the invention, the supply and removal of the hydrophobic fluid can thus take place by way of the same end face of the membrane body, which in some cases enables a construction of the device according to the invention that takes up comparatively little structural space. It goes without saying that the same principle can similarly be transferred to membrane bodies having other geometries, that is to say for example membrane bodies constructed in the shape of a plate or sphere.

In particular, where the water to be separated from the fluid flow containing water is gaseous, that is to say where the water to be separated from the fluid flow containing water is water vapor, it is advantageous for recovery of the water to condense the water vapor contained in the hydrophobic fluid, that is to say to convert the water that is in its gaseous phase, in the form of water vapor, into its liquid phase. For this purpose, the device according to the invention advantageously includes at least one condensation system that is associated with the membrane body, in particular being downstream thereof, for condensing the gaseous water that is taken up or contained in the hydrophobic fluid. By way of the condensation system, which typically includes at least one cooling system for cooling the water vapor that is taken up or contained in the hydrophobic fluid to or below its condensation temperature, it is thus possible to bring about the conversion of water vapor, that is to say gaseous water, into liquid water.

It is also conceivable for condensation of the water vapor already to take place within the membrane body or in the hydrophobic fluid, before cooling. This will be explained with reference to the example below, for a fluid flow, containing water vapor and at a temperature of approximately 70° C. In a fluid flow of this kind, a water vapor content of approximately 30% may be produced, that is to say that at atmospheric pressure (1 bar) there is a water vapor partial pressure of 300 mbar. As a result of the permeation of the water vapor through the membrane body and into the membrane body interior space, the temperature of the hydrophobic fluid in the membrane body interior space is similarly approximately 70° C. A pressure of 1 bar similarly prevails in the membrane body interior space. Because the water vapor molecules are hence under a pressure of 1 bar, they condense within the hydrophobic fluid, that is to say that the water vapor already liquefies within the hydrophobic fluid, before cooling.

Where condensation of water vapor takes place in the hydrophobic fluid within the membrane body interior space, a corresponding condensation system must be replaced by a cooling system or heat dissipation system by way of which cooling of the heated hydrophobic fluid takes place. It is thus possible to associate at least one cooling system for cooling the hydrophobic fluid with the membrane body, in particular placing it downstream of the latter.

By way of the condensation of the water or water vapor that is taken up or contained in the hydrophobic fluid, the hydrophobic fluid can thus be divided into a phase mixture containing two mutually separated phases, that is to say a first phase comprising the hydrophobic fluid and a second phase comprising water, wherein the second phase comprising water is simply to be separated out of this phase mixture. It goes without saying that the one phase may have left or remaining in it a small proportion of the respectively other phase, depending on the respective miscibility of the two phases.

Advantageously, the pressure within the condensation system may be elevated by comparison with the pressure prevailing within the membrane body in order to keep the condensation temperature of the water or water vapor taken up or contained in the hydrophobic fluid as high as possible, such that a cooling source of comparatively high temperature can be used for condensation of the water or water vapor taken up or contained in the hydrophobic fluid. This approach is advantageous in respect of the energy efficiency of the device according to the invention or separation of the water or water vapor that is taken up or contained in the fluid flow from the fluid flow. Elevation of the pressure within the condensation system is particularly advantageous if the accumulation or dispersion of the water or water vapor in the hydrophobic fluid and hence the taking up of water or water vapor in the hydrophobic fluid is further promoted by a drop in pressure, that is to say a difference in pressure, between the fluid flow containing water or water vapor and the hydrophobic fluid, which as mentioned is typically brought about by a negative pressure within the membrane body or the membrane body interior space.

As further already mentioned above, the device may include at least one separating system, which is downstream of the membrane body or where appropriate the condensation system associated with or downstream of the membrane body, for the chemical and/or physical, in particular mechanical, separation of the water that is taken up in the hydrophobic fluid from the hydrophobic fluid. By way of the separating system, the water that is taken up or contained in the hydrophobic fluid is separated from the hydrophobic fluid. The hydrophobic fluid that has been freed of the water can be supplied to the membrane body again. The water that has been freed of the hydrophobic fluid and thus recovered can be used for various purposes outside or within the device according to the invention. The separation of liquid water that is taken up or contained in the hydrophobic fluid from the hydrophobic fluid may in particular take place mechanically, that is to say by sedimentation (deposition or settling), such that the separating system is accordingly set up for sedimentation of the water that is taken up in the hydrophobic fluid. The separating system can thus include for example at least one sedimentation tank. It goes without saying that in principle other chemical and/or physical separating principles for separating the water that is taken up or contained in the hydrophobic fluid from the hydrophobic fluid are conceivable.

Other embodiments provide a method for the separation of water, in particular water vapor, from a fluid flow containing water, in particular water vapor. The water or water vapor to be separated is transferred through at least one membrane body that is permeable to water or water vapor, in general water molecules, into at least one hydrophobic fluid that is within a membrane body interior space delimited by the membrane body, and is taken up in the hydrophobic fluid.

In principle, all the statements made in connection with the device according to the invention, in all the embodiments and variants described, apply analogously to the disclosed method. Conversely, all embodiments and variants disclosed in connection with the method apply analogously to the disclosed device.

In some embodiments of the method, the hydrophobic fluid may flow through the membrane body interior space, in particular in the manner of a circuit. The hydrophobic fluid can thus flow or circulate in particular in a circuit within which the membrane body and/or the membrane body interior space are connected. It is possible for further functional components of the device implementing the method according to the invention, such as condensation facilities for condensing gaseous water contained in the hydrophobic fluid, and/or cooling facilities for cooling hydrophobic fluid that is heated by previous condensation, and/or separating facilities for the chemical and/or physical separation of the water that is taken up or contained in the hydrophobic fluid from the hydrophobic fluid, to be connected within the circuit.

A negative pressure may advantageously be applied within the membrane body interior space. The negative pressure serves in particular as an additionally supporting propulsive force for the passage or permeation of the water or water vapor that is contained in the fluid flow containing water through the membrane body and into the membrane body interior space and hence into the hydrophobic fluid.

In particular where the water to be separated from the fluid flow containing water is gaseous, that is to say where the water to be separated from the fluid flow containing water is water vapor, it is advantageous for recovery of the water if the gaseous water taken up or contained in the hydrophobic fluid, that is to say the water vapor taken up or contained in the hydrophobic fluid, is condensed.

In this case, in order to keep the condensation temperature of the water vapor to be condensed as high as possible, and thus similarly to enable the use of a cooling source at a comparatively high temperature, it is advantageous if the pressure of the gaseous water or water vapor that is taken up or contained in the hydrophobic fluid is elevated before the condensation.

The water taken up or contained in the hydrophobic fluid may be separated from the hydrophobic fluid chemically and/or physically, in particular mechanically. In particular, for separating liquid water that is taken up or contained in the hydrophobic fluid from the hydrophobic fluid, a mechanical separation in the form of sedimentation (deposition or settling) is possible. It goes without saying that in principle other chemical and/or physical separating principles for separating water that is taken up or contained in the hydrophobic fluid from the hydrophobic fluid are also conceivable.

Where the separation of water taken up or contained in the hydrophobic fluid from the hydrophobic fluid takes place by way of sedimentation, the flow rate of the hydrophobic fluid may be reduced in the region of a corresponding separating system for the purpose of sedimentation. In this way, the degree of efficiency of the sedimentation can be improved.

Within the context of the disclosed method, it is possible to use as the hydrophobic fluid in particular a natural or synthetic organic liquid, in particular a natural or mineral or synthetic oil.

Figure 1:
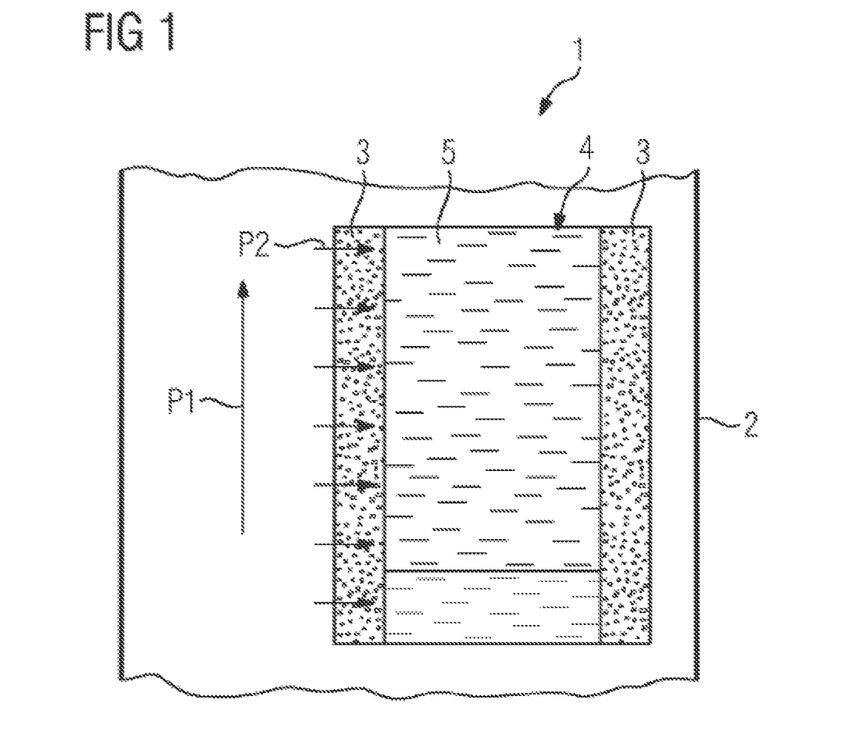
FIGS. 1-3 each show an illustration of the principle of a device for the separation of water, in particular water vapor, from a fluid flow containing water, in particular water vapor, according to an example embodiment of the invention.

FIG. 1 shows an illustration of the principle of a device 1 for the separation of water, in particular water vapor, from a fluid flow containing water, in particular water vapor, according to an example embodiment of the invention.

Figure 2:
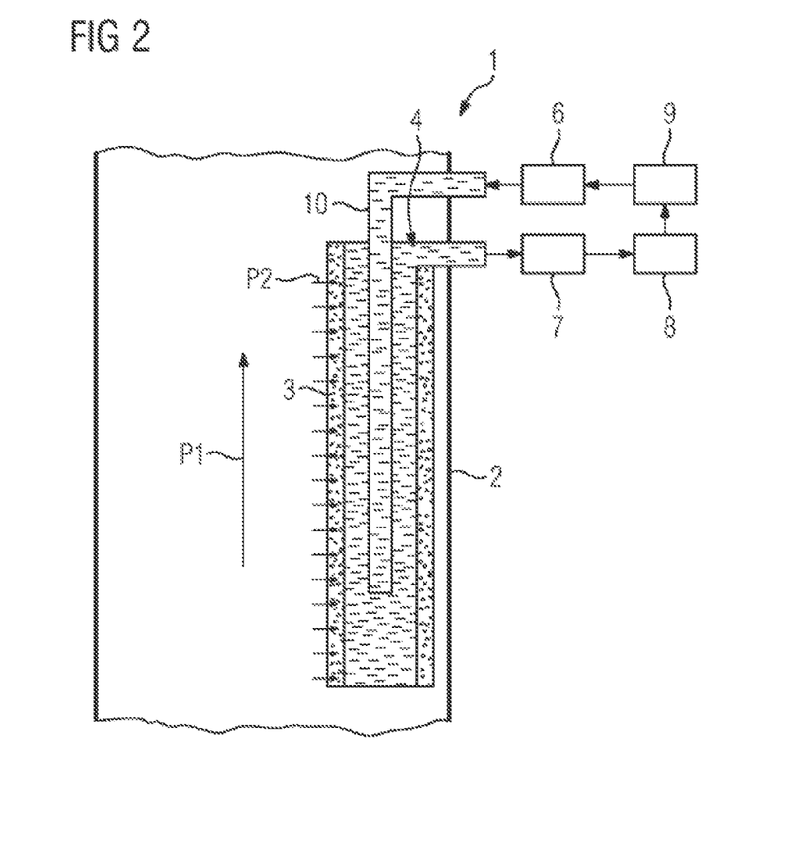
Figure 3:
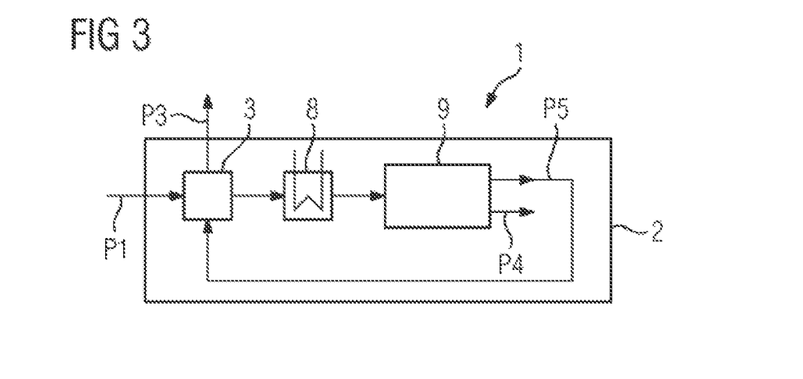

The device 1 that is shown in FIG. 1, as indeed the devices 1 that are shown in FIGS. 2, 3, are in each case constructed or set up to perform a method for the separation of water, in particular water vapor, from a fluid flow containing water, in particular water vapor, according to an exemplary embodiment of the invention.

The device 1 is connected directly into a channel 2 that guides a gas flow containing water vapor. The gas flow that is indicated by the arrow P1 is for example a waste gas or waste air flow containing water vapor, which occurs in the context of a technical process, such as the operation of a power station, in particular a gas turbine power station. As well as water vapor, the gas flow typically contains other, in particular gaseous, constituents, such as oxygen, nitrogen, carbon dioxide, nitrogen oxides, sulfur oxides, etc. The gas flow is typically heated to a particular temperature brought about by the respective technical process from which it arises.

The device 1 includes a hollow cylindrical membrane body 3. The membrane body 3 could similarly also have another geometry, that is to say it could for example also be constructed in the shape of a plate or sphere.

Since the membrane body 3 is formed by a material selective to water vapor, such as sulfonated poly(ether ether ketone), the membrane body 3 is permeable to the water vapor contained in the gas flow. Thus, the other constituents of the gas flow cannot permeate the membrane body 3 but flow along the membrane body 3 without cooling significantly. The material forming the membrane body 3 is porous, that is to say it has an in particular open-pored structure having a pore size between 1 and 10 nm.

The membrane body 3 delimits a membrane body interior space 4. A hydrophobic fluid 5, that is to say for example a mineral or vegetable oil, flows through the membrane body interior space 4. The hydrophobic fluid 5 that flows through the membrane body interior space 4 serves to take up water vapor that has permeated through the membrane body 3 and into the membrane body interior space 4, that is to say water molecules that have permeated through the membrane body 3 and into the membrane body interior space 4. The permeation of water vapor or water molecules through the membrane body 3 and into the membrane body interior space 4 is indicated by the arrows P2.

The essential propulsive force for the permeation of the water vapor contained in the gas flow through the membrane body 3 and into the membrane body interior space 4, and hence for the accumulation or dispersion of the water vapor in the hydrophobic fluid 5, is a drop in concentration (drop in water concentration) between the interfaces of the membrane body 3 on the side with the gas flow containing water out of which the water or water vapor is to be separated, outside the membrane body 3, and on the side with the hydrophobic fluid 5 within the membrane body 3 or within the membrane body interior space 4. The water concentration in the gas flow containing water is typically markedly higher than the water concentration in the hydrophobic fluid 5.

The drop in concentration is maintained in particular in that the hydrophobic fluid 5 flows through the membrane body interior space 4 continuously and at a particular flow rate. For this purpose, a supply system 6 for supplying the hydrophobic fluid 5 to the membrane body interior space 4 and a removal system 7 for removing the hydrophobic fluid 5 enriched with water vapor from the membrane body interior space 4, are part of the device 1 (cf. FIG. 2). The supply system 6, and indeed the removal system 7, include suitable conveying facilities (not shown), such as pumps, for supplying and removing the hydrophobic fluid 5 to and from the membrane body interior space 4.

Consequently it is ensured that hydrophobic fluid 5 laden with water is removed from the membrane body interior space 4 and unladen hydrophobic fluid 5 is supplied to the membrane body interior space 4. In a state of equilibrium that results from the ratio of the quantity of hydrophobic fluid 5 that is supplied to the membrane body interior space 4 and the quantity thereof removed from the membrane body interior space 4, the concentration of water vapor contained in the hydrophobic fluid 5 that flows through the membrane body interior space 4 is typically markedly lower than the concentration of water vapor contained in the gas flow.

In order to create the propulsive force that brings about the permeation of water vapor from the gas flow containing water vapor through the membrane body 3 and into the membrane body interior space 4, it is essential that there is a very small concentration of water vapor at the surface of the membrane body 3 facing the gas flow containing water vapor.

Where appropriate, it is possible to dispense with the supply system 6 and the removal system 7 and hence a forced flow of the hydrophobic fluid 5 within the membrane body interior space 4, since it is also in principle possible within the context of the invention for the separation of the water contained in the hydrophobic fluid 5 also to be able to take place as a result of natural convection or gravitational force and the resulting accumulation of water at the bottom of the membrane body 3.

In order to further increase the propulsive force for the permeation of the water vapor contained in the gas flow through the membrane body 3 and into the membrane body interior space 4 and thus into the hydrophobic fluid 5 flowing in the membrane body interior space 4, a negative pressure may prevail in the membrane body interior space 4. Consequently, the pressure within the membrane body interior space 4 lies markedly below the pressure outside the membrane body 3, and thus within the channel 2 through which the gas flow flows. To bring about the negative pressure within the membrane body 3 or within the membrane body interior space 4, the device 1 includes a pressure regulating facility (not shown), for example in the form of a vacuum pump. It goes without saying that it is also conceivable, with the same objective, as an alternative or in addition to increase the pressure outside the membrane body 3.

The water vapor taken up in the hydrophobic fluid 5 is typically in the form of individual, distributed or at least partly coagulated bubbles of gas or liquid there. The hydrophobic fluid 5 containing water vapor can thus be considered a dispersion.

Separation of the water vapor contained in the hydrophobic fluid 5 from the hydrophobic fluid 5 is performed in a condensation step and, subsequent thereto, a separating step.

In the condensation step, which is carried out by way of a condensation system 8 that is part of the device 1 according to the invention and is downstream of the membrane body 3 (cf. FIGS. 2, 3), the water vapor contained in the hydrophobic fluid 5 is condensed, that is to say that the water contained in the hydrophobic fluid 5 is converted from the gaseous state to the liquid state. As shown in principle in FIG. 1, in this way a phase mixture having two mutually separated phases, that is to say a first phase substantially comprising the hydrophobic fluid and a second phase substantially comprising water, can be formed. The respective phases may contain small proportions of the respectively other phase.

In order to obtain as high as possible a condensation temperature and as high as possible a water vapor partial pressure of the water vapor to be condensed in the condensation step and thus to keep as low as possible the cooling requirement for condensation or the cooling power needed for condensation, this being provided by way of a cooling system (not shown) associated with the condensation system 8, and to initiate it at a high temperature, the pressure within the condensation system 8 can be increased. For the condensation, new cooling sources can thus be used or alternatively, if existing cooling sources are used, the temperature difference for the heat transfer can be increased, which makes it possible to use more compact cooling facilities having lower power consumption. Similarly, it is possible in this way to increase the spread of temperature of a cooling medium used for cooling, such as air, such that the mass flow of cooling agent required or to be applied for cooling and the associated energy requirement can be reduced.

In the separating step, which follows the condensation step and is carried out by way of a separating system 9 that is part of the device 1 according to the invention and is downstream of the condensing system 8 (cf. FIGS. 2, 3), the second phase comprising condensed water is separated from the first phase comprising hydrophobic fluid 5, chemically and/or physically. The separation of the second phase comprising water from the first phase comprising hydrophobic fluid 5 may be performed for example by way of sedimentation. Advantageously, a low flow rate is to be provided in the separating system 9 in order to enable sedimentation processes, or to increase the efficiency of sedimentation processes.

FIG. 2 shows an illustration of the principle of a device 1 for the separation of water, in particular water vapor, from a fluid flow containing water, in particular water vapor, according to an exemplary embodiment of the invention. Referring to FIG. 2, a conceivable constructional implementation of the device 1 according to the invention can be seen. The device 1 is once again connected directly within a channel 2 guiding a gas flow containing water vapor.

Projecting into the membrane body interior space 4 that is delimited by the hollow cylindrical membrane body 3 is a supply channel 10 that extends through the membrane body 3, coaxially with respect to the longitudinal axis of the membrane body 3. In the region of the end face of the membrane body 3 that is at the top in FIG. 2, the supply channel 10 is connected to a supply system 6 that is similarly arranged in the region of the upper end face of the membrane body 3. By way of the supply system 6, hydrophobic fluid 5 that is ready to take up water vapor is conveyed continuously into the supply channel 10, this hydrophobic fluid 5 passing out of the supply channel 10 in the region of the free end of the supply channel 10, which lies in the region of the lower end face of the membrane body 3. The hydrophobic fluid 5 that has passed out of the supply channel 10 flows upward within an annular space that radially surrounds the supply channel 10, and in so doing it is enriched with water vapor that has permeated through the membrane body 3 and into the membrane body interior space 4, and it is removed from the upper end face of the membrane body 3 by way of the removal system 7, which is similarly arranged in the region thereof.

It can be seen that the removal system 7 communicates with the supply system 6 by way of the condensation system 8 and the separating system 9, which are connected between them, as a result of which the above-mentioned closed circuit is formed. The circuit thus includes in particular the following functional components that are part of the device 1 according to the invention: the supply system 6, membrane body 3, removal system 7, condensation system 8 and separating system 9.

Where condensation of water vapor already takes place within the membrane body 3, a condensation system 8 is not absolutely necessary. In that case, a cooling system or heat dissipation system by way of which cooling of the hydrophobic fluid takes place would in particular be connected downstream of the membrane body 3.

FIG. 3 shows an illustration of the principle of a device 1 for the separation of water, in particular water vapor, from a fluid flow containing water, in particular water vapor, according to an exemplary embodiment of the invention. The exemplary embodiment shown in FIG. 3 is substantially an illustration of the exemplary embodiment shown in FIG. 2 as a process flow diagram.

Referring to FIG. 3, the sequence of an exemplary embodiment of the method according to the invention for the separation of water vapor from a gas flow containing water vapor can be explained once again. The water vapor contained in the gas flow permeates into the hydrophobic fluid 5 flowing through the membrane body interior space 4, in particular as a result of a drop between the water vapor concentration prevailing outside the membrane body 3 and the water vapor concentration prevailing within the membrane body 3, that is to say within the membrane body interior space 4. The remaining gas flow, at least partly freed of water vapor originally contained therein, flows out of the device 1 (cf. arrow P3). It goes without saying that the gas flow can be returned such that it flows through the device 1 a plurality of times.

The hydrophobic fluid 5 that is laden with water vapor is supplied to a condensation system 8, which in FIG. 3 is illustrated simply as a cooling system or heat exchanger. The water vapor contained in the hydrophobic fluid is condensed in a condensation step that is carried out in the condensation system 8. Here, a phase mixture that contains a first phase substantially comprising the hydrophobic fluid and a second phase substantially comprising water is formed, and the second phase containing the condensed water vapor is separated from this phase mixture in a separating step that is carried out in a separating system 9 downstream of the condensation system 8, as indicated by the arrow P4.

The first phase, containing only the hydrophobic fluid 5, is guided back into the membrane body interior space 4, as indicated by the arrow P5. For this purpose, conveying facilities (not shown), for example in the form of pumps, that are connected between the separating system 9 and the membrane body 3 may be provided.

Although the invention has been illustrated and described in detail with detailed reference to the preferred exemplary embodiment, the invention is not restricted by the disclosed examples, and other variations may be derived therefrom by those skilled in the art without departing from the scope of the invention.

What is claimed is:

1. A device for separating water vapor from a fluid flow containing water vapor, the device comprising:
    a water-permeable membrane body comprising a hollow cylinder arranged in the fluid flow, the water-permeable membrane body defining a membrane body interior space inside the hollow cylinder, wherein the water-permeable membrane body has a porous structure configured to allow water vapor to pass through the water-permeable membrane body from the fluid flow to the membrane body interior space,
    a supply channel delivering a hydrophobic fluid to the membrane body interior space along a central longitudinal axis of the hollow cylinder through a first axial end of the water-permeable membrane body,
    wherein the hydrophobic fluid flows through the supply channel into the membrane body interior space in a first axial direction and then flows in a reverse axial direction through an annulus defined by the water-permeable membrane body around the supply channel to exit the membrane body interior space through the first axial end,
    wherein an outer surface of the water-permeable membrane body facing away from the membrane body interior space is exposed to the fluid flow, and an inner surface of the water-permeable membrane body facing the membrane body interior space is exposed to the hydrophobic fluid, and
    wherein the hydrophobic fluid at the inner surface of the water-permeable membrane body has a lower concentration of water vapor than the fluid flow at the outer surface of the water-permeable membrane, which difference in water vapor concentration defines a propulsive force for a permeation of water vapor contained in the fluid flow through the water-permeable membrane body and into the membrane body interior space, wherein the hydrophobic fluid takes up the water vapor having permeated into the membrane body interior space, and
    an outlet configured to carry a flow of the hydrophobic fluid containing the water vapor out of the device, the outlet receiving the hydrophobic fluid from the annulus.

2. The device of claim 1, including a supply system configured to supply the hydrophobic fluid into the membrane body interior space and a removal system configured to remove the hydrophobic fluid from the membrane body interior space.

3. The device of claim 1, including at least one of:
    at least one condensation system arranged downstream of the water-permeable membrane body and configured to condense gaseous water contained in the hydrophobic fluid, or
    at least one cooling system arranged downstream of the water-permeable membrane body and configured to cool hydrophobic fluid that has been heated by condensation of water vapor.

4. The device of claim 1, including a separating system arranged downstream of the water-permeable membrane body and configured to provide a chemical and/or physical separation of the water that is taken up in the hydrophobic fluid from the hydrophobic fluid.

5. The device of claim 1, wherein the hydrophobic fluid is at least one of a natural or synthetic organic gas, or a natural or synthetic organic liquid.

6. A method for separating water vapor from a fluid flow containing water vapor, the method comprising:
    providing the fluid flow through a conduit of a water vapor separation device in which a water-permeable membrane body comprising a hollow cylinder is located, such that the fluid flow passes outside the hollow cylinder;
    providing a flow of a hydrophobic fluid through a first axial end of the water-permeable membrane body in a supply channel aligned along a central longitudinal axis of the hollow cylinder;
    transferring the water vapor to be separated from the fluid flow through the water-permeable membrane body into the hydrophobic fluid after it exits the supply channel and is located within an annulus defined between the supply channel and the hollow cylinder, such that the hydrophobic fluid takes up the water vapor having transferred through the hollow cylinder, allowing the hydrophobic fluid containing the water vapor to travel through the annulus to the first axial end of the hollow cylinder and then from the water vapor separation device to a downstream condensing device for condensing the water vapor to liquid water.

7. The method of claim 6, wherein the hydrophobic fluid flows through a fluid circuit that passes through an interior space of the hollow cylinder.

8. The method of claim 6, comprising applying a negative pressure is within an interior space of the hollow cylinder.

9. The method of claim 6, comprising elevating a pressure of gaseous water contained in the hydrophobic fluid before condensation.

10. The method of claim 6, comprising chemically and/or physically separating water contained in the hydrophobic fluid from the hydrophobic fluid.

11. The method of claim 6, the hydrophobic fluid comprises at least one of a natural or synthetic organic gas or a natural or synthetic organic liquid.

12. A system for separating water vapor from a fluid flow containing water vapor, the system comprising:
    a water-permeable separator arranged in the fluid flow, the water-permeable separator comprising a water-permeable membrane with a tubular body defining a hollow cylinder with an interior space,
    a hydrophobic fluid supply channel extending longitudinally within the interior space of the hollow cylinder, the hydrophobic fluid supply channel configured to supply hydrophobic fluid into the water-permeable separator along a central longitudinal axis of the hollow cylinder;

wherein the water-permeable separator is configured to carry the supplied hydrophobic fluid through a first region of the interior space of the hollow cylinder outside of and coaxial to the hydrophobic fluid supply channel in a longitudinal removal direction opposite central longitudinal axis;

wherein an outer surface of the water-permeable membrane facing away from the separator interior space is exposed to the fluid flow, and an inner surface of the water-permeable membrane facing the separator interior space is exposed to the hydrophobic fluid in the first region of the separator interior space;

wherein the hydrophobic fluid at the inner surface of the water-permeable membrane has a lower concentration of water vapor than the fluid flow at the outer surface of the water-permeable membrane, which difference in water vapor concentration defines a propulsive force for a permeation of water vapor contained in the fluid flow through the water-permeable membrane and into the first region of the separator interior space outside the supply channel, wherein the hydrophobic fluid in the first region takes up the water vapor having permeated through the water-permeable membrane and carries the water vapor along the longitudinal removal direction opposite the central longitudinal axis; and a hydrophobic fluid removal channel configured to remove the hydrophobic fluid containing the water vapor from the water-permeable separator.

* * * * *